Jan. 4, 1955  R. A. KROPP  2,698,667
WHEELED VEHICLE CONVERTIBLE TO CRAWLER TYPE
Original Filed Feb. 28, 1948  4 Sheets-Sheet 2

Inventor
Roy A. Kropp
by
Attys

Jan. 4, 1955 R. A. KROPP 2,698,667
WHEELED VEHICLE CONVERTIBLE TO CRAWLER TYPE
Original Filed Feb. 28, 1948 4 Sheets-Sheet 3

Inventor
Roy A. Kropp
by
Attys

Jan. 4, 1955   R. A. KROPP   2,698,667
WHEELED VEHICLE CONVERTIBLE TO CRAWLER TYPE
Original Filed Feb. 28, 1948   4 Sheets-Sheet 4

Inventor
Roy A. Kropp
Attys

United States Patent Office 2,698,667
Patented Jan. 4, 1955

2,698,667

WHEELED VEHICLE CONVERTIBLE TO CRAWLER TYPE

Roy A. Kropp, River Forest, Ill., assignor to Kropp Forge Company, Cicero, Ill., a corporation of Illinois Application December 16, 1949, Serial No. 133,411

5 Claims. (Cl. 180—9.1)

This invention relates to improvements in a vehicle which may be converted from the wheel type automotive vehicle to a tractor or crawler type vehicle. More particularly this invention has to do with a novel system for coordinating the wheel steering mechanism and the operation of the transmission system of the vehicle.

The present application is a division of my copending application—Serial No. 11,999, filed February 28, 1948 and since abandoned.

In the parent application, Serial No. 11,999, there is contained a complete disclosure of the novel convertible vehicle which features, among other items, a novel endless track structure, a gear change transmission and a braking system for a convertible vehicle.

The novel mechanisms of the present invention are particularly adapted for use with a convertible vehicle which, in one form, is an automotive type roadster arranged for movement on dirigible wheels and, in another form, is a tractor equipped with crawler tracks for performing heavy pulling operations such as the operations usually performed by a farm tractor.

It is evident that when the vehicle is to be used as a roadster it must be equipped with a standard automotive transmission, while a lowspeed, high power transmission should be provided when the vehicle is used as a tractor. Further, when the vehicle is used as an automotive type roadster, the steering should take place through the customary steering wheel while the steering of the tractor form should take place through the crawler tracks with the front wheels locked in a straight-ahead position.

It is therefore an important object of this invention to provide a linkage connection between the steering mechanism and the transmission for contemporaneously actuating both mechanisms to assure that the vehicle will be operated in a slow speed range when used as a tractor and will be provided with a standard range of speeds for operation as an automotive type vehicle.

It is another object of this invention to provide a novel convertible vehicle which may be run on wheels or on crawler tracks secured under its wheels.

A still further object of this invention is to provide an auxiliary two-speed transmission connected in the main drive shaft which, in one setting, permits the speed of the vehicle to be controlled directly through the main transmission for operation of the vehicle as an automobile. In the other setting, a reduction of speed of rotation of the drive shaft is effected so that, while the main transmission will still control the speed of the vehicle, the speed range of operation will be greatly reduced. Thus, a powerful low speed drive may be used for operation of the vehicle as a tractor.

A still further object of this invention is to provide a linkage connected between the steering mechanism and the transmission of the vehicle so that, when the vehicle is operated as a tractor, the front steering wheels will be locked in a straight ahead position.

Other and further objects, features and advantages of this invention will be apparent to those skilled in the art from the following detail description of the annexed sheets of drawings which, by way of example, illustrate one embodiment of the invention.

On the drawings:

Figure 4 is an enlarged, vertical sectional view taken on line IV—IV of Figure 1;

Figure 5 is an enlarged, fragmentary vertical sectional view taken on line V—V of Figure 2;

Figure 6 is a side elevational view of the center tensioning wheel of the motor vehicle shown in its retracted, suspended position;

As shown on the drawings:

Figure 1:
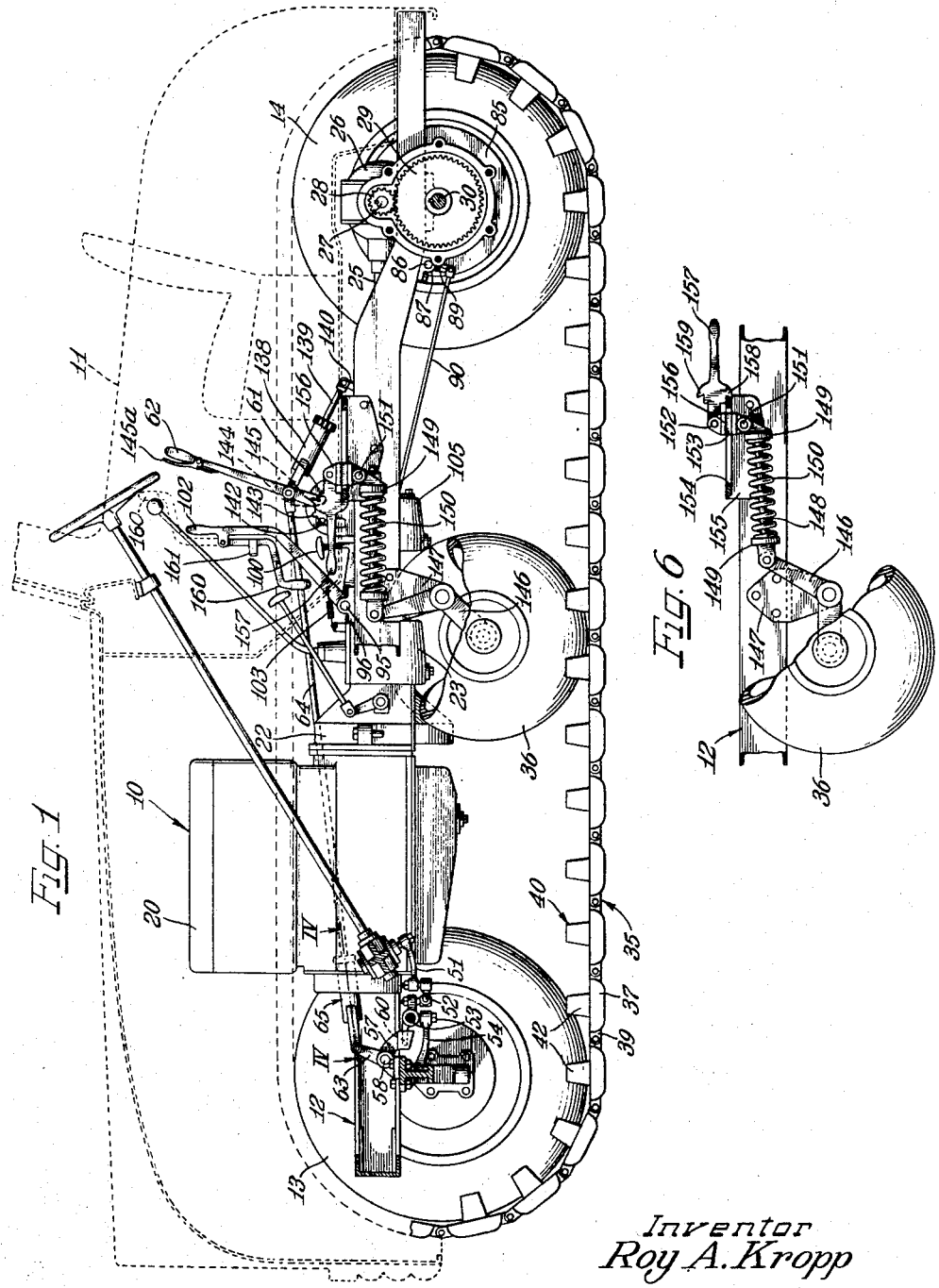
Figure 1 is a fragmentary, side elevational view, partly in section and partly broken away, of the motor vehicle of the present invention showing the body portions in dotted lines and with a crawler track secured on the wheels.
Figure 2:
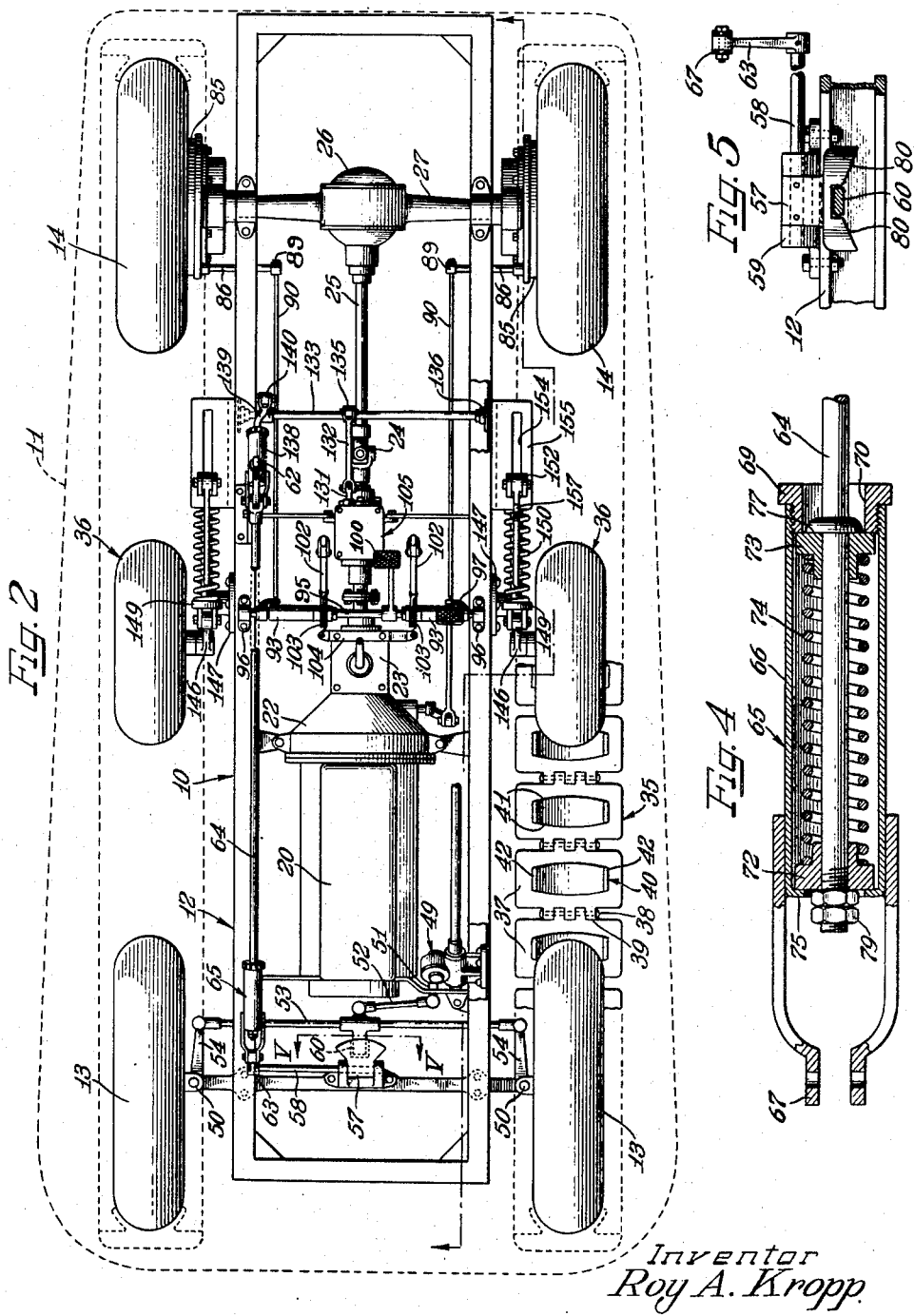
Figure 2 is a fragmentary plan view of a motor vehicle of the present invention with the body of the vehicle removed and shown only in dotted lines.
Figure 3:
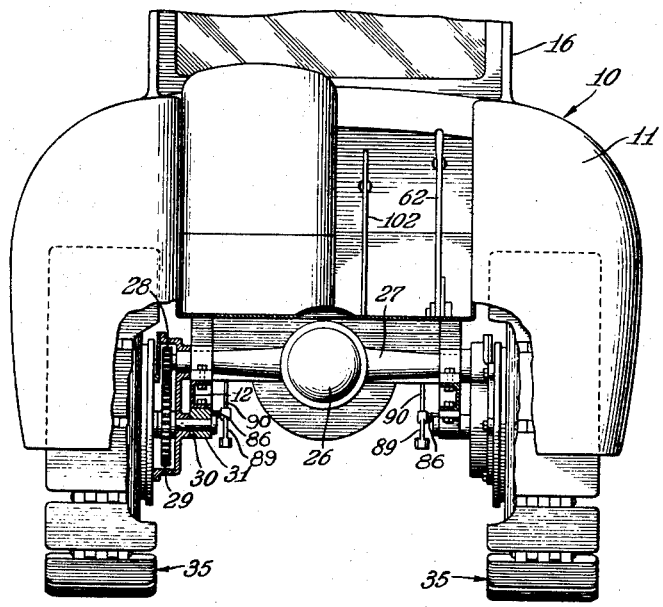
Figure 3 is a fragmentary rear elevational view, partly in section and partly broken away, of the novel automotive vehicle of Figure 1.

The reference numeral 10 in Figures 1, 2 and 3 indicates generally a small motor vehicle having a streamlined body 11 including an operator's cab 16 mounted on a frame structure 12 for support by dirigible front wheels 13 and rear drive wheels 14.

As seen in Figure 2, a power plant 20, such as a typical gasoline engine, is arranged to drive the rear wheels 14 through a clutch 22, a transmission 23, a universal joint 24, a drive shaft 25, a differential 26, and a rear axle 27. A pinion gear 28 (Figure 1) is keyed to the rear axle 27 and is in mesh with a driven gear 29 connected to the axle 30 of each rear wheel. The axle 30 may be advantageously journaled in a bearing block 31 secured to the underside of one member of the frame 12.

The motor vehicle 10 is adapted to be operated as an automotive type roadster on the wheels 13 and 14 or as a tractor when crawler tracks 35 are mounted on the wheels. When the vehicle is operated as a tractor, a pair of auxiliary wheels 36, pivotally mounted from the frame 12, as will be explained hereinafter, are movable downwardly to contact the crawler track and maintain its tensioned position on the bed of the road.

*Construction of the crawler track*

Referring to Figures 1 and 2, it is seen that the crawler track 35 is made up of a series of substantially rectangular transverse plate members 37 hingedly connected together at their leading and trailing edges by pins 38 disposed in apertured lugs 39 projecting from the edges of the plate members 37. The ends of the pins 38 are swaged over to prevent them from sliding out of the lugs. However, at one hinged connection a removable bolt may be used as a pivot pin in order that the crawler track may be separated for dismounting. For the purpose of grippingly engaging the tires there is provided on each plate 37 an arcuate contact member 40 projecting up from the top surface of the plate and having a contact surface shaped to fit the contour of the tire.

The member 40 has generally arcuate leading and trailing edges 41 and has upstanding wall members 42 which are arranged to snugly engage the side walls of the tire (Figure 1).

*Steering mechanism*

When the vehicle 10 is operated as a wheel type automobile, steering movement of the front wheels 13 is accomplished through a standard worm and gear steering assembly 49 (Figure 2) which is connected to the front wheel king pins 50 by a pitman arm 51, a drag link 52, a tie rod 53, and a steering arm 54.

However, when the vehicle is operated as a tractor it is not possible to pivot the front wheels when the crawler tracks are in place, and steering must be effected by stopping or slowing down the crawler track on one side of the vehicle while allowing the track on the other side to propel the vehicle forwardly at its regular speed.

Thus, to convert a wheel type vehicle to a tractor, provision must be made for locking the conventional steering mechanism in position with the front wheels of the vehicle pointed directly ahead. Next, means must be provided for braking each rear wheel independently of the other wheel so that the movements of the crawler tracks can be separately controlled.

To lock the steering mechanism there is provided an inverted U-shaped locking member 57 (Figure 5) which is pinned to a shaft 58 journaled for pivoting in bearing block 59 on a forward cross member of the frame structure 12. When the shaft 58 is pivoted in one direction, the U-shaped locking member moves downwardly over a forwardly projecting arm 60 connected to the tie rod 53 and thus prevents sidewise steering movement of the tie rod. Since the arm 60 is disposed centrally on the tie rod, the front wheels will be locked in a position pointed directly ahead.

As best seen in Figure 1, the movement of the shaft 58 and consequently the locking member 57 is controlled from the cab of the vehicle by a lever 62 pivoted from an upstanding support member 61 and connected to the shaft 58 through a radius arm 63 and a tie rod 64. A spring-loaded cylinder 65 is connected between the tie rod 64 and the arm 63 and is arranged to resiliently transmit the pull of the tie rod 64 to the arm 63.

The spring cylinder 65, shown in detail in Figure 4, comprises a tubular body portion 66 having at one end an apertured fork member 67 for connection to the radius arm 63 and having at the other end a cap member 69 with a central aperture 70. A pair of apertured spring retainers 72 and 73 are held in spaced relation in the tubular body 66 by a coil spring 74, one retainer abutting the cap member 69 and the other abutting an inturned flange 75 of the body 66. The tie rod 64 is inserted in the central apertures of the retainers 72 and 73 with a shoulder 77 abutting the spring retainer 73. Lock nuts 79 are threaded on the end of the tie rod 64 when the spring 74 is in its expanded position.

It will be readily seen that when the tie rod 64 is pulled to the right (Figure 4) by the clockwise pivoting of the control rod 62, the spring 74 will be compressed in the tube 66 until the resistance of the shaft 58 is overcome, at which time the shaft 58 and the locking member 57 will be pivoted into locking position. If the forwardly projecting arm 60 of the steering mechanism has not been properly centered, the locking member 57 will be resiliently pressed down on the arm 60 so that as soon as the steering mechanism is moved through the centering position the locking member 57 will be snapped into position around the arm. It is to be noted that the locking member 57 has slanted lower walls 80 (Figure 5) which facilitate the centering of the arm 60.

The provision of the spring-loaded cylinders 65 in the locking mechanism is a particular safety feature of this invention which causes the locking member 57 to be snapped into position and precludes the possibility of the vehicle being run off the crawler track by steering movement of the wheels.

Figure 7:
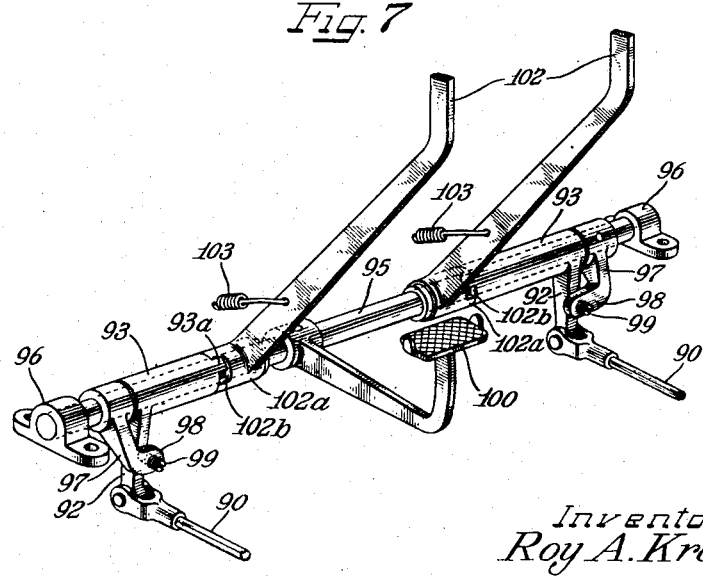
Figure 7 is a fragmentary perspective view of the brake control mechanism of the present invention.

When the motor vehicle 10 is operated as a wheel type of vehicle, braking is accomplished through typical mechanical brakes which may be either of the internally or externally expanding type. Separate linkages are connected to each rear wheel, and each linkage includes a brake drum 85 (Figures 1 and 2) and a brake actuating rod 86 journaled in a bearing block 87 secured to the frame 12. A lever 89, secured to the rod 86, is pivotally connected to a brake rod 90. At its forward end the brake rod 90 is pivotally secured to an arm 92 (Figure 7) integrally formed at one end of a tubular sleeve 93. A rod 95, journaled at either end in bearings 96 secured to the frame 12, passes freely through each tubular sleeve 93. A lever 97, having a lower laterally extending foot portion 98, is secured to the rod 95 adjacent each sleeve 93 with the foot portion 98 overhanging the arm 92 of the sleeve 93. Adjusting screws 99 are provided on each foot portion 98 for equalizing the effective length of the brake rods 90.

Movement of the rod 95 is controlled by a foot pedal 100 secured thereto. When the pedal 100 is pushed down, the rod 95 will rotate in its bearings 96 and cause each lever 97 to contact its associated arm 92 and pivot it about the rod 95. Forward movement of the arms 92 pulls the brake rods 90 forwardly and causes braking of the rear wheels. Thus, when the vehicle is operated as an automobile, both rear wheels may be braked contemporaneously through the foot pedal 100.

As previously mentioned, when the vehicle is operated as a tractor it is necessary for steering purposes to be able to brake each wheel separately and allow independent operation of the crawler track on each side of the vehicle. This is accomplished by separate hand levers 102 which have lower tubular portions 102a rotatably mounted on the rod 95 adjacent each sleeve 93. A slot 102b in the tubular portion 102a is arranged to receive a laterally projecting arm 93a of the sleeve 93. The lever 102 and consequently the slot 102b will be returned to the position shown in Figure 1 by a spring 103 secured between the lever 102 and a bar 104 (Figure 2) secured across the housing of the transmission 23. Thus, when the arm 102 is rotated, the slot 102b will contact the arm 93a and cause the associated brake to be applied. However, when the sleeve 93 is rotated by the foot pedal 100, the lever 102 will not be moved due to the fact that the arm 93a can move in the slot 102b. Since the levers 102 act independently of each other, each rear wheel can be braked separately.

*Power transmission*

If a vehicle is to be operated efficiently as a wheel type automobile, it must be equipped with a standard automotive type transmission, whereas if it is to be operated as a tractor, it must have a transmission that will provide high pulling power in low gear and a relatively low cruising speed in high gear.

In the present invention there is provided an auxiliary, two-speed transmission 105 mounted on the drive shaft 25 between the main transmission 23 and the universal joint 24. This two-speed transmission 105 (Figure 8) comprises a housing 107 in which is journaled at one end the drive shaft 25 and at the other end a stub-shaft 108 connected through the coupling 109 to the shaft leading from the main transmission 23. A low speed gear 110 is rotatably mounted on bearings 111 disposed on the drive shaft 25. This gear 110 is provided with a laterally extending tubular flange portion 112 in which is cut an internal gear 113. A countershaft 115 is journaled in the lower end of the housing 107 and carries a small gear 116 which has approximately one-half as many teeth as the low speed gear 110 with which it is in mesh. A second gear 117, having more teeth than the gear 116 but less than the low speed gear 110, is also secured for rotation with the countershaft 115 and is in mesh with a gear 119 secured to the stub shaft 108. This gear 119, which has approximately the same number of teeth as the gear 117, is also provided with a laterally extending tubular flange 121 in which is cut an internal gear 122.

At its forward end the drive shaft 25 is journaled on a bearing 124 in a recess 125 of the gear 119 and is provided adjacent the forward end with a splined portion 127 on which is disposed a sliding gear 129. The sliding gear 129 is movable by means of a lever 130 rigidly connected to a rod 131 slidably journaled in the housing 107. The sliding gear 129 is arranged to mesh with either of the internal gears 113 and 122 and therefore it may be selectively moved along the splined portion 127 of the drive shaft 25 to engage either internal gear.

Figure 8:
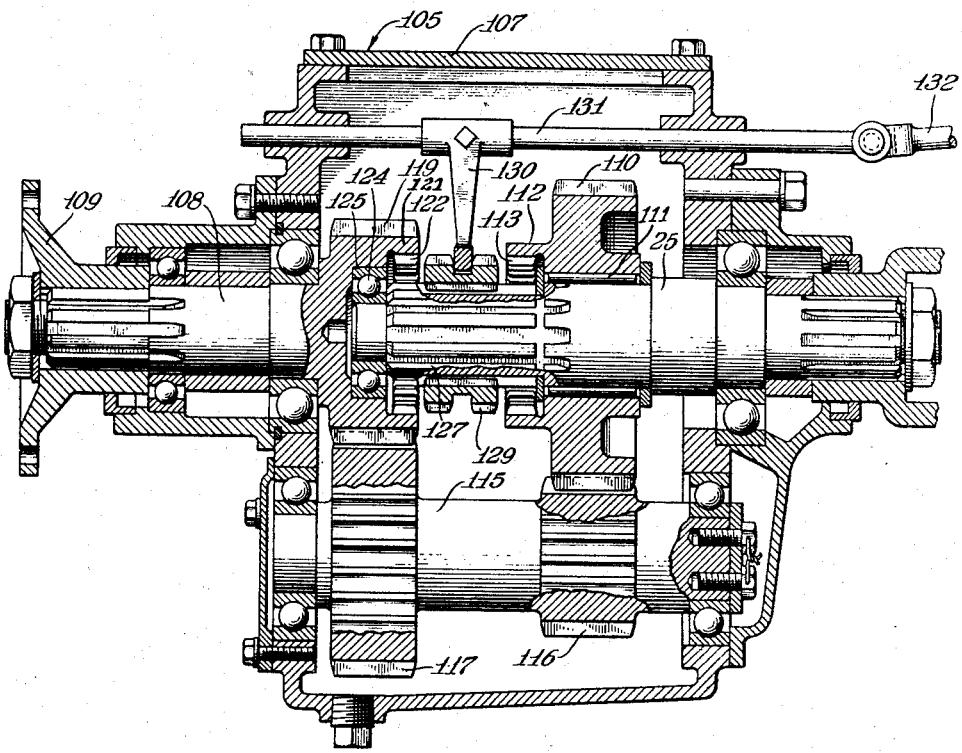
Figure 8 is a vertical sectional view taken through the novel two-speed transmission use in the motor vehicle of this invention.

If the vehicle 10 is to be used as an automotive type roadster, the sliding gear 129 is moved forward or to the left, as seen in Figure 8, to mesh with the gear 122. Then the shaft 108, which is secured to the main transmission 23, will be connected directly to the drive shaft 25 through the gear 119, the internal gear 122, the sliding gear 129, and the splined portion 127 of the drive shaft 25. In this setting, the gear 110 will rotate freely on the bearing 111 due to the action of the gears 116 and 117 which rotate with the countershaft 115. Thus, the vehicle will be provided with a standard automotive type transmission for this type of operation.

If the vehicle 10 is to be operated on crawler tracks as a tractor, the sliding gear 129 is moved rearwardly to mesh with the internal gear 113. Then the shaft 108 will drive the drive shaft 25 through the gear 119 in mesh with the gear 117 and through the gear 116 which is in mesh with the gear 110. Then, since the gear 110 is connected through the sliding gear 129 to the splined portion 127 of the drive shaft 25, the shaft will rotate with the gear 110. Since the gears 119 and 117 have approximately the same number of teeth, the countershaft 115 will rotate for all settings of the main transmission 23 at approximately the same speed as the shaft 108. However, due to the fact that the gear 110 has considerably more teeth than the gear 116, the drive shaft 25 will rotate at a lower speed than the stub shaft 115. Thus, a second low speed transmission system is available for use with the tractor type installation.

As best illustrated in Figures 1 and 2, the sliding rod 131 which is arranged to actuate the sliding gear 129 is reciprocated by a tie rod 132 which is secured for rotation with a shaft 133 through a radius rod 135. This shaft 133 is journaled at either end in bearing blocks 136 secured to the frame 12 and is rotated by the control lever 62 through a spring-loaded cylinder 138, a rod 139 slidably disposed in the cylinder 138, and a radius rod 140 that is pivotally connected at one end to the rod 139 and is keyed at the other end to the shaft 133.

The spring-loaded cylinder 138 is identical in construction to the cylinder 65 which is connected to the steering mechanism lock device and has the same function, namely, to exert a resilient pressure on the sliding gear 129 so that it will move into mesh with one of the internal gears as soon as they are aligned. An automatic safety device is thus provided through which the operator can be assured that the low speed transmission will be connected into the system as soon as the gears are aligned. Thus, there is no possibility of the crawler tracks being thrown from the wheels due to excessive speed of operation.

Since the front wheels must be locked in a straight-ahead position when the vehicle is operated as a tractor and since the low speed transmission must also be used under these conditions, it has been found convenient to connect the mechanism controlling these parts to the same control lever 62. With this interconnection, the low speed transmission must always be connected when the vehicle is being used as a tractor, and, conversely, when the vehicle is being driven by the low speed transmission as a tractor, the front wheels must be locked in a straight-ahead position.

The support plate 61 on which the control lever 62 is pivoted is provided with an aperture 142 which includes two notched detents 143 and 144. When the control lever is moved backwardly into the steering wheel locking position (Figure 1), a pin 145, retractable by a lever 145a near the top of the control lever 62, is moved into the detent 144 to hold the linkage in that position. When the steering wheel is unlocked, the pin 145 will be positioned in the forward detent 143.

*Mechanism for tensioning the crawler track*

It is desirable in a tractor that the crawler track be in continuous contact with the road bed between the front and rear wheels in order that maximum traction be realized. In this invention there is provided a retractible wheel 36 on either side of the vehicle located substantially midway between the end of the vehicle. Each wheel 36 is pivotally connected on a bell crank 146 (Figure 6) which is in turn pivotally secured to a flange plate 147 projecting downwardly from the frame 12. A rod 148 is resiliently held between end plates 149 by means of a spring 150 and is pivotally connected at one end to the bell crank 146 and at the other end to a lug 151 extending downwardly from a sliding guide member 152.

The guide member 152 has a body portion 153 extending through a slot 154 cut longitudinally of the vehicle in an angle member 155 and also having shoulders 156 overhanging the slot and resting on the upper surface of the angle member 155. A lever 157 is pivotally mounted on the guide member 152 and is arranged to slide the guide member back and forth in the slot 154.

When the guide member 151 is pulled to the right, as seen in Figure 6, the wheel 36 is raised off the ground due to the pivoting of the bellcrank 146. The wheel 36 may be locked in the suspended position by means of a hook 158 projecting from one side of the lever 157 and arranged to engage over the edge of the angle member 155.

The wheel may also be locked in its lower position against the crawler tracks, as shown in Figure 1, by a hook 159 extending from the opposite side of the lever 157 for engaging over the edge of the angle member 155. It is to be noted, however, that even in the latter locked position, the wheel 36 is free to pivot upwardly due to the resilient mounting of the rod 148.

It is evident of course that the weight of each wheel 36 will be sufficient to cause the lowering of the wheel when the hook member 158 is disengaged from the edge of the angle member 154. However, when it is desired to suspend the wheel in locked position, it is necessary to lift up the wheel and thus cause the lever to move backwardly in the slot and to have the hook portion 158 engage over the edge of the angle member to relock the wheel in suspended position.

As previously mentioned, there is a door (not shown) in the ceiling of the cab which pivots upwardly on hinges. This door is provided to allow the operator to stand up in the cab and drive the tractor in an upright standing position. For this purpose the brake levers 102 have been equipped with a pivotal extension member 160 which, as shown in Figure 1, is arranged to be pivoted upwardly and has a strap member 161 which engages over the top portion of the lever 102 to hold the extension in upright position. Thus, when the operator is standing up and operating the tractor in this position, the brake control levers are still within easy reach of his hand.

From the foregoing description it is seen that there is provided a means for attaching a crawler track to an automotive vehicle having but single wheel mountings. The novel braking, steering and power transmitting mechanism of this invention cooperates to convert a small type automotive vehicle into an efficient farm tractor, a conversion which has heretofore been impracticable.

The novel design of the crawler track of this invention for the first time affords means whereby a crawler track may be mounted on conventional pneumatic tires without the use of sockets, guide lugs, or other mechanical devices on the wheel. Thus, a crawler track is provided which is not only easy to install but is also an efficient drive member in operation.

The spring-loaded lever system for locking the steering mechanism also represents a distinct advance in the field, since through this resilient system the locking mechanism will be forced into locking position as soon as the wheels are put in a straight-ahead position.

Further, the lever system that controls the operation of the low speed transmission provides a novel spring-urged means of coordinating the position of the front wheels with the speed of the vehicle.

It will be understood that modifications and variations may be effected without departing from the scope of the novel concepts of the present invention.

I claim as my invention:

1. In a convertible vehicle, a frame structure, front and rear wheels mounted from said frame structure, a crawler track removably disposed around said wheels on either side of said vehicle, a steering mechanism operatively connected to said front wheels, means for locking said steering mechanism when the front wheels are disposed in a straight-ahead direction, a drive shaft connected to said rear wheels for driving the same, a main automotive type transmission arranged for driving said drive shaft, a slow speed transmission associated with said main transmission for reducing the speed range of said main transmission, shifting means associated with said slow speed transmission for changing the speed range of said main transmission, and means on said frame structure interconnected with said locking means and said shifting means for contemporaneously operating said locking means and said shifting means whereby the front wheels will always be locked in a straight-ahead direction when said main transmission is operating in the reduced speed range and whereby the steering mechanism will be unlocked when said main transmission is operating in its automotive speed range.

2. In combination in a tractor, single dirigible front wheels and power-driven single rear wheels, a crawler track engaged over said front and rear wheels on each side of the tractor, a transmission system connected to said rear wheels and having a high and a low range of speeds, steering means connected to said front wheels, and means connected to said steering means and to said transmission system for contemporaneously locking said front wheels in a straight-ahead direction and for shifting the transmission into the low speed range to prevent high speed operation of said vehicle when said crawler tracks are in place.

3. In a vehicle convertible from an automobile to a tractor, a frame structure, dirigible front wheels and power-driven rear wheels mounted on said frame structure, a prime mover for driving said rear wheels, steering mechanism including a steering arm connected to each front wheel and tie rod connected between said steering arms, an arm projecting forwardly from the central portion of said rod, a locking member pivotally mounted on said frame and movable for engaging over said arm to prevent steering movement of said rod, a transmission system on the frame structure connected to said rear wheels and having a high and low range of speeds, and means connected to said transmission system and to said locking member for simultaneously shifting the transmission into the low speed range and moving the locking member into locking position.

4. In a convertible vehicle, a frame structure, steerable front wheels and power-driven rear wheels on said frame, a steering linkage controlling the movement of said front wheels, a locking member movable into engagement with said steering linkage to prevent steering movement of said front wheels, a transmission having a high and low speed range, a rod connected in said transmission for shifting between high and low speed ranges, a support member secured across said frame structure, a crank arm pivotally mounted on said support member, and connected to said rod of said transmission, a link connected to said crank arm and including a spring-pressed resilient connection, and a manually operable lever connected to said link and to said locking member for simultaneously actuating said link to shift the transmission to the low speed range and moving said locking member into locking position.

5. In a convertible motor vehicle having a frame, power-driven rear wheels on the frame, steerable front wheels on the frame, steering arms connected to the front wheels and a tie rod between the steering arms, means for locking the front wheels in a straight-ahead position including a manually operated lever, an arm projecting from the tie rod, a locking member on the frame arranged to engage said arm when the front wheels are in a straight-ahead position, a spring-loaded linkage connected between said lever and said locking member, a transmission system on the frame connected to the rear wheels and having a high and low range of speeds, and means connected to said lever and to said transmission system for simultaneously shifting the transmission system into the low speed range and locking said front wheels in a straight-ahead position.

References Cited in the file of this patent

UNITED STATES PATENTS

| | | |
|---|---|---|
| 1,169,402 | Holt | Jan. 25, 1916 |
| 1,249,680 | Sink | Dec. 11, 1917 |
| 1,262,896 | Woodhead | Apr. 16, 1918 |
| 1,350,668 | Oversmith | Aug. 24, 1920 |
| 1,498,525 | Cole | June 17, 1924 |
| 1,533,531 | While | Apr. 14, 1925 |
| 1,596,480 | Cosgrove et al. | Aug. 17, 1926 |
| 1,632,665 | Mitchell | June 14, 1927 |
| 1,888,420 | Barnes | Nov. 22, 1932 |
| 1,980,033 | Brown | Nov. 6, 1934 |
| 2,341,883 | Sloan | Feb. 15, 1944 |
| 2,537,400 | Drong | Jan. 9, 1951 |

FOREIGN PATENTS

| | | |
|---|---|---|
| 610,045 | France | May 29, 1926 |